United States Patent
Czarnowski et al.

(10) Patent No.: US 7,621,128 B2
(45) Date of Patent: Nov. 24, 2009

(54) COMBINED EGR VALVE AND COOLER BY-PASS

(75) Inventors: Robert Czarnowski, Oxford, MI (US); Timm Kiener, Lake Orion, MI (US); Volker Joergl, Ortonville, MI (US)

(73) Assignee: BorgWarner Inc., Auburn Hills, MI (US)

( * ) Notice: Subject to any disclaimer, the term of this patent is extended or adjusted under 35 U.S.C. 154(b) by 29 days.

(21) Appl. No.: 11/607,708

(22) Filed: Dec. 1, 2006

(65) Prior Publication Data
US 2007/0125081 A1 Jun. 7, 2007

Related U.S. Application Data

(60) Provisional application No. 60/741,773, filed on Dec. 2, 2005.

(51) Int. Cl.
F02M 25/07 (2006.01)
F02B 33/44 (2006.01)
F01N 5/02 (2006.01)
F28F 27/02 (2006.01)
F16K 1/22 (2006.01)
F16K 1/16 (2006.01)
G05D 23/00 (2006.01)

(52) U.S. Cl. .................. 60/605.2; 123/568.12; 165/51; 165/103; 165/297; 165/283; 251/305; 137/625.46; 137/601.16

(58) Field of Classification Search ................ 60/605.2; 123/568.12; 165/51, 103, 297, 283, 158–159; 251/305; 137/625.46, 601.16; F02M 25/07
See application file for complete search history.

(56) References Cited

U.S. PATENT DOCUMENTS

| 3,570,590 | A | * | 3/1971 | Kofink | 165/51 |
| 4,060,096 | A | * | 11/1977 | Schade | 137/74 |
| 5,190,077 | A | * | 3/1993 | Pawelzik et al. | 137/625.46 |
| 6,135,152 | A | * | 10/2000 | Knapp | 137/625.46 |
| 6,141,961 | A | * | 11/2000 | Rinckel | 60/288 |

(Continued)

FOREIGN PATENT DOCUMENTS

EP 1363012 A1 * 11/2003

(Continued)

OTHER PUBLICATIONS

A full certified English language translation of Yves Resseguier et al. (Pub. No. WO 03/085252 A2).*

*Primary Examiner*—Thai Ba Trieu
(74) *Attorney, Agent, or Firm*—Warn Partners, P.C.

(57) ABSTRACT

The present invention is an exhaust gas recirculation (EGR) valve for an engine having an exhaust gas recirculation cooler operable for receiving exhaust gas from an exhaust, and delivering the exhaust gas to an intake. The present invention also includes an exhaust gas recirculation bypass passage operable for receiving exhaust gas from an exhaust, bypassing the exhaust gas recirculation cooler, and delivering the exhaust gas to an intake, as well as a single valve operably associated with the exhaust gas recirculation cooler and the exhaust gas recirculation bypass passage. The single valve is selectively operable for opening or closing flow from the exhaust to the exhaust gas recirculation cooler, the exhaust gas recirculation bypass passage, or both, the single valve also operable for metering flow therebetween.

29 Claims, 3 Drawing Sheets

U.S. PATENT DOCUMENTS

| | | | |
|---|---|---|---|
| 6,378,509 B1 | 4/2002 | Feucht et al. | 60/605.2 |
| 6,702,190 B1* | 3/2004 | Nohl et al. | 165/41 |
| 7,032,577 B2* | 4/2006 | Rosin et al. | 123/568.12 |
| 7,168,419 B2* | 1/2007 | Rosin et al. | 123/568.12 |
| 7,213,587 B2* | 5/2007 | Rutten | 123/568.24 |
| 7,219,661 B2* | 5/2007 | Aberle | 123/568.12 |
| 7,222,615 B2* | 5/2007 | Buck et al. | 123/568.12 |
| 7,255,130 B2* | 8/2007 | Martins et al. | 137/625.46 |
| 7,261,086 B2* | 8/2007 | Nuang | 60/290 |
| 7,284,544 B2* | 10/2007 | Hatano | 123/568.12 |
| 7,313,918 B2* | 1/2008 | Melchior | 60/605.2 |
| 2001/0032467 A1 | 10/2001 | Martin | 60/605.2 |
| 2005/0199381 A1* | 9/2005 | Mercz et al. | 123/568.12 |
| 2005/0247353 A1* | 11/2005 | Kao | 137/625.41 |
| 2007/0068500 A1* | 3/2007 | Joergl et al. | 123/568.24 |
| 2007/0089412 A1* | 4/2007 | Sommerhoff | 60/605.2 |
| 2007/0175437 A1* | 8/2007 | Yamaguchi et al. | 123/568.12 |
| 2008/0034736 A1* | 2/2008 | Chiba et al. | 60/291 |

FOREIGN PATENT DOCUMENTS

| | | | |
|---|---|---|---|
| EP | 1 555 421 A2 | | 7/2005 |
| EP | 1 630 403 A1 | | 3/2006 |
| EP | 1746263 A2 | * | 1/2007 |
| FR | 2 860 832 A1 | | 4/2005 |
| FR | 2883037 A1 | * | 9/2006 |
| JP | 2005337141 A | * | 12/2005 |
| JP | 2006125215 A | * | 5/2006 |
| JP | 2006233947 A | * | 9/2006 |
| WO | WO 03/062625 A1 | | 7/2003 |
| WO | WO 03/067044 A1 | | 8/2003 |
| WO | WO 03/085252 A2 | | 10/2003 |
| WO | WO 2006/024495 A1 | | 3/2006 |

* cited by examiner

COMBINED EGR VALVE AND COOLER BY-PASS

CROSS-REFERENCE TO RELATED APPLICATIONS

This application claims the benefit of U.S. Provisional Application No. 60/741,773, filed Dec. 2, 2005.

FIELD OF THE INVENTION

The present invention relates to EGR valves and their use in combination with an EGR cooler and an EGR cooler bypass valve.

BACKGROUND OF THE INVENTION

Future emissions requirements for Diesel Engines around the world will require engine concepts capable of achieving low NOx and low PM emissions while at the same time having a high integration of components/functions for low system cost and smallest package. Exhaust gas recirculation (EGR) valves and EGR cooler bypass valves are usually constructed as two separate valves.

However, often time having two valves to perform the function of delivering exhaust gas to an EGR cooler, or bypass the EGR cooler and deliver the exhaust gas directly into the intake manifold of the engine can be more costly due to the increased amount of components, or may be limited by packaging constraints.

Accordingly, there exists a need for a single valve to perform the function of selectively metering exhaust gas through an EGR cooler, as well as having the ability to bypass the EGR cooler partially or completely.

SUMMARY OF THE INVENTION

The present invention is an exhaust gas recirculation (EGR) valve for an engine having an exhaust gas recirculation cooler operable for receiving exhaust gas from an exhaust, and delivering the exhaust gas to an intake. The present invention also includes an exhaust gas recirculation bypass passage operable for receiving exhaust gas from an exhaust, bypassing the exhaust gas recirculation cooler, and delivering the exhaust gas to an intake, as well as a single valve operably associated with the exhaust gas recirculation cooler and the exhaust gas recirculation bypass passage.

The single valve is selectively operable for opening or closing flow from the exhaust to the exhaust gas recirculation cooler, the exhaust gas recirculation bypass passage, or both; the single valve also operable for metering flow therebetween.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
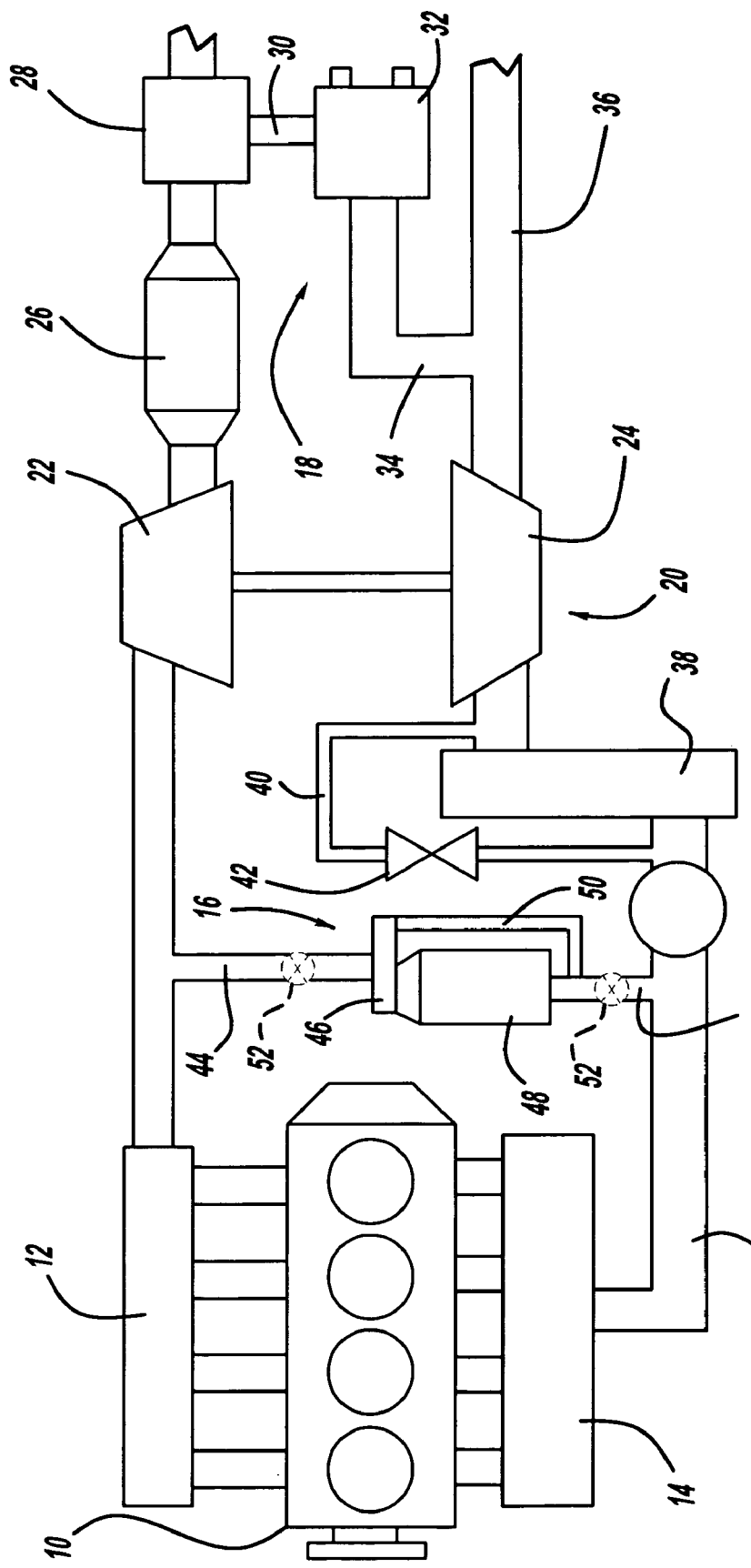
FIG. 1 is a diagram of an engine breathing system having a high-pressure EGR loop, a low-pressure EGR loop, and a turbocharger unit.
Figure 2:
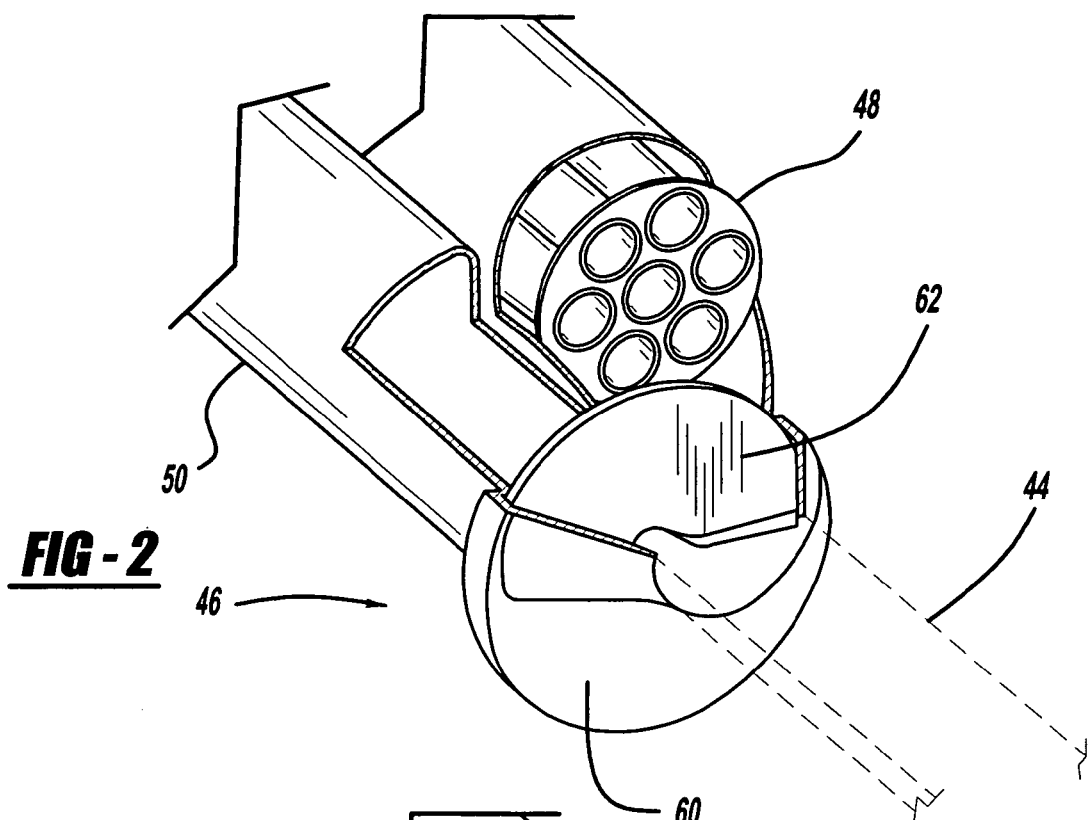
FIG. 2 is a perspective, partially broken away, view of a valve in a closed position, integrated into an EGR cooler and an EGR cooler bypass conduit, according to the present invention.

An engine 10 having an exhaust gas valve according to the present invention is shown in FIG. 1. The engine 10 has an exhaust manifold 12 and an intake manifold 14. There are two exhaust gas recirculation (EGR) loops, a high-pressure EGR loop 16, and a low-pressure EGR loop 18. The engine 10 also operates with the use of a turbocharger unit 20 which includes a turbine 22 and a compressor 24. The high-pressure EGR loop 16 is located upstream of the turbine 22 and downstream of the compressor 24, while the low-pressure EGR loop 18 is located downstream of the turbine 22, and upstream of the compressor 24.

Connected to the turbine 22 is a diesel particulate filter (DPF) 26 which receives exhaust gas from the turbine 22. The low-pressure EGR loop 18 includes a combined EGR and throttle valve 28, a first EGR conduit 30, an EGR cooler 32, and a second EGR conduit 34. The second EGR conduit 34 is connected to an intake pipe 36. The intake pipe is connected to the compressor 24.

The compressor 24 is connected to a charge air cooler 38, and a first intake conduit 40. Located in the intake conduit 40 is charge air cooler bypass valve 42. The high-pressure EGR loop 16 includes an exhaust gas recirculation (EGR) passage 44, a single valve or an exhaust gas valve 46, an exhaust gas recirculation (EGR) cooler 48, and an exhaust gas recirculation (EGR) bypass passage 50. In an alternate embodiment, a flow control valve 52 is incorporated into the present invention, if desired, for controlling the total amount of flow from the exhaust manifold 12. The EGR cooler 48 and the EGR bypass passage 50 both are connected to a single pipe 54, which is connected to a main intake conduit 56. The main intake conduit 56 is connected to the intake manifold 14 of the engine 10. The flow control valve 52 can be incorporated into the EGR passage 44, the single pipe 54, or any other location along the flow of exhaust gas to control the total amount of exhaust gas flow.

The exhaust gas valve 46 is shown in greater detail in FIGS. 2-5. In the embodiment shown in FIG. 1, the exhaust gas valve 46 is incorporated into the EGR cooler 48 and the EGR bypass passage 50. However, the exhaust gas valve 46, the EGR cooler 48, and the bypass passage 50 can be incorporated into a single component. The EGR passage 44, exhaust gas valve 46, the EGR cooler 48, and the bypass passage 50 could also all be incorporated into a single component. It is within the scope of the invention to have other variations of EGR passage 44, exhaust gas valve 46, the EGR cooler 48, and the bypass passage 50 incorporated together in various ways. The exhaust gas valve 46 is comprised of a housing 60 which circumscribes a solid semi-circular disc 62. Preferably, the exhaust gas valve 46 includes the use of a seal between the housing 60 and the semi-circular disk 62 to prevent exhaust gas leakage. The exhaust gas valve 46 can be used to control the temperature of the EGR flow, and can be used to control the gaseous temperatures entering the engine on the intake side. Also, in another alternate embodiment, the flow control valve 52 is incorporated into the housing 60 of the exhaust gas valve 46 for controlling the overall flow, as well as the flow distribution between the EGR cooler 48 and the bypass passage 50.

In operation, exhaust gas from the exhaust manifold 12 flows through the EGR passage 44 and can flow into either the EGR cooler 48 or the EGR bypass passage 50. The semi-circular disc 62 can be positioned to close both the EGR bypass passage 50 and the EGR cooler 48, so as to not allow any exhaust gas to flow therein. When the semi-circular disc 62 is in this position, all of the exhaust gas flows from the exhaust manifold 12 directly into the turbine 22.

Figure 3:
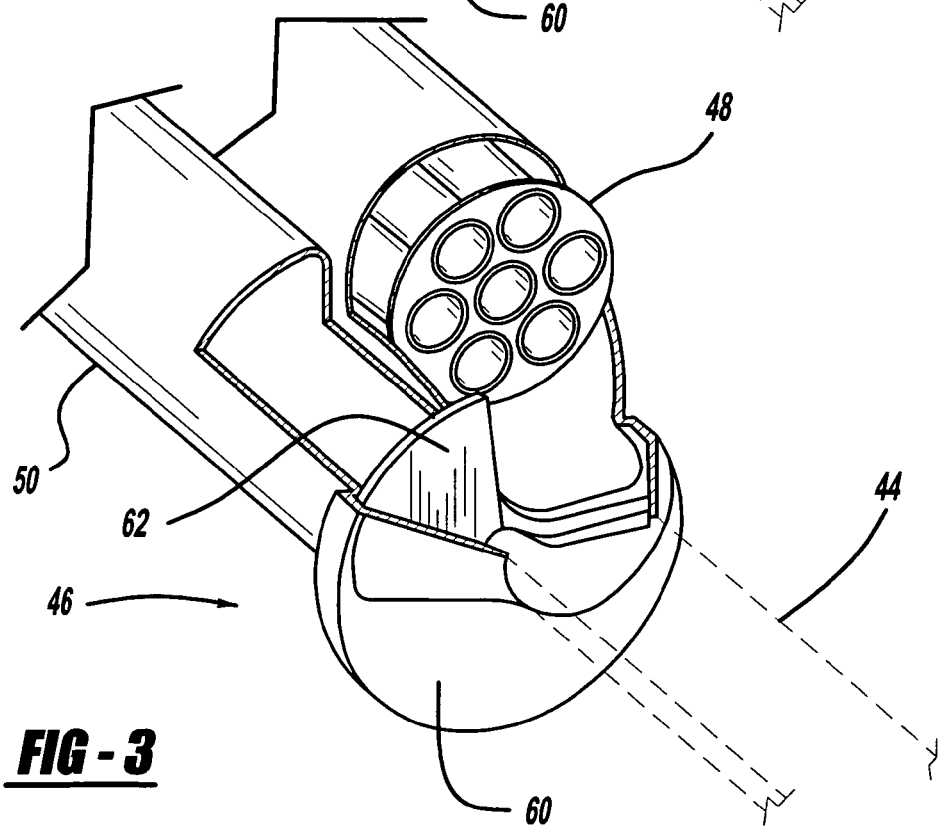
FIG. 3 is a perspective, partially broken away, view of a valve integrated into an EGR cooler and an EGR cooler bypass conduit, and in a position to restrict exhaust gas flow through an EGR cooler bypass conduit, according to the present invention.
Figure 4:
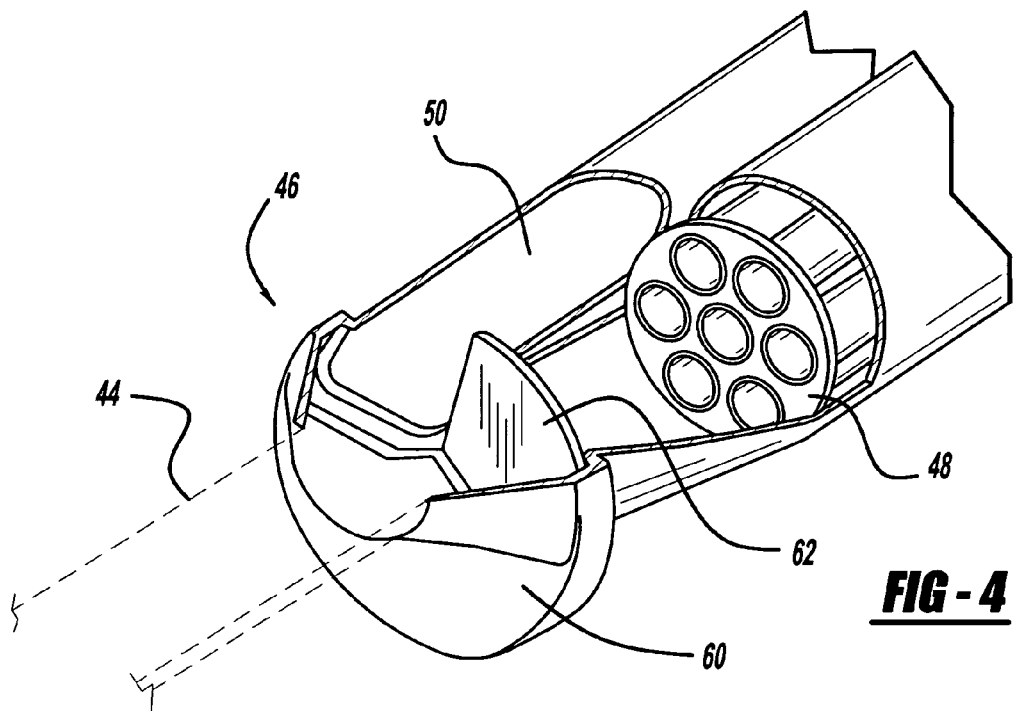
FIG. 4 is a perspective, partially broken away, view of a valve integrated into an EGR cooler and an EGR cooler bypass conduit, and in a position to restrict exhaust gas flow through the EGR cooler, according to the present invention.

When the semi-circular disc 62 is moved into the position shown in FIG. 3, the EGR bypass passage 50 is blocked, and all of the exhaust gas then flows through the EGR cooler 48. When the semi-circular disc 62 is moved into the position shown in FIG. 4, the flow of exhaust gas through the EGR cooler 48 is blocked, and all of the exhaust gas recirculation flows through the EGR bypass passage 50.

Figure 5:
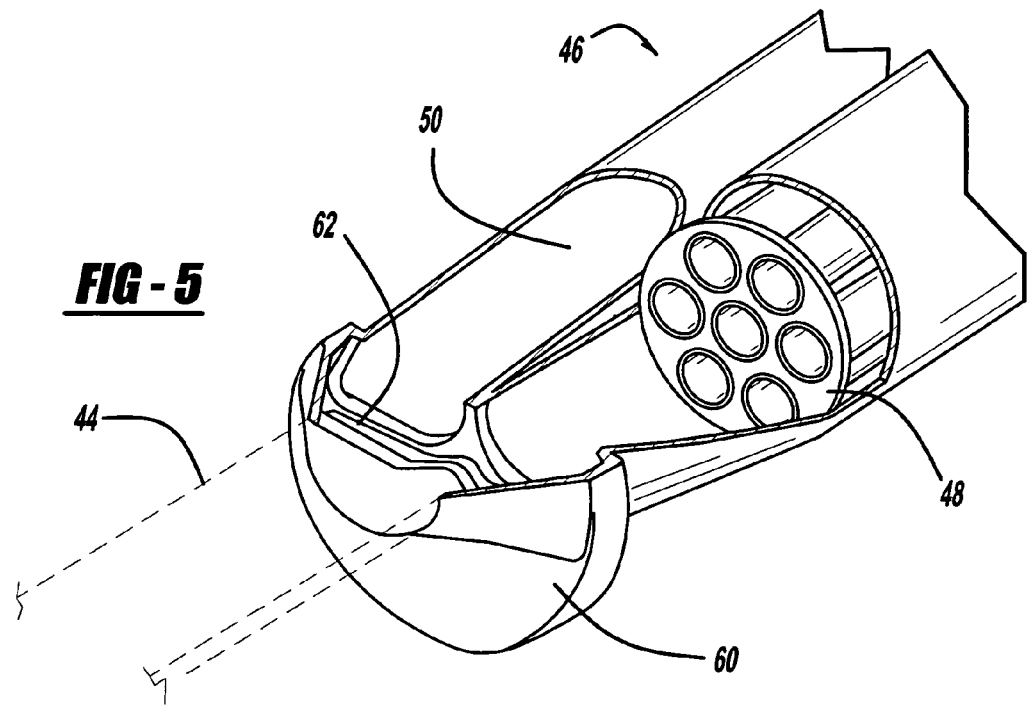
FIG. 5 is a perspective, partially broken away, view of a valve integrated into an EGR cooler and an EGR cooler bypass conduit, in a fully open position, according to the present invention.

In FIG. 5, the semi-circular disc 62 is in a position such that exhaust gas is flowing through both the EGR bypass passage 50 and the EGR cooler 48.

The exhaust gas valve 46 can also be used to meter the flow of exhaust gas between the EGR cooler 48 and the EGR bypass passage 50 as needed based on the various engine 10 operating conditions by actuating the semi-circular disk 62. Distributing the flow of exhaust gas between the EGR cooler 48 and the EGR bypass passage 50 provides for control over the temperature of the exhaust gas, and control over intake manifold air temperatures. The present invention is also not limited to incorporating the exhaust gas valve 46 into the EGR bypass passage 50 and the EGR cooler 48. The exhaust gas valve 46 can also be incorporated into a combination of the EGR passage 44 and the EGR bypass passage 50 upstream of the EGR cooler 48. Additionally, the exhaust gas valve 46 can be integrated with some of the other components such as the turbine 22 and the EGR passage 44, or the turbine 22 and the EGR bypass passage 50. The pipe 54 connected to the EGR cooler 48 and the EGR bypass passage 50 could be connected to the intake pipe 36, instead of the main intake conduit 56, taking the exhaust gas flow from upstream of the turbine 22, and placing the exhaust gas into system upstream of the compressor 24.

Actuation of the exhaust gas valve 46 can be accomplished through the use of a single actuator (not shown), which can be pneumatic, hydraulic, or electronic, and can use any kind of linkage, gears, or other way of transferring power to rotary motion. The actuator is used for adjusting the position of the semi-circular disk 62 in response to signals received from a suitable controller. The exhaust gas valve 46 could be controlled by the vehicle's electronic control unit (not shown). When a specific temperature is desired, for instance, in the intake manifold, the electronic control unit (ECU) can actuate the exhaust gas valve 46 to direct exhaust gas through just the EGR cooler 48 or just the EGR bypass passage 50, or meter the flow through both to adjust the temperature of the air flowing into the intake manifold 14 of the engine 10 as may be required for certain engine operating conditions. The exhaust gas valve 46, EGR cooler 48, and EGR bypass passage 50 can also be connected at a location upstream of the compressor 24, allowing the exhaust gas valve 46 to control the temperature of the air flowing into the compressor 24.

Also, while it has been shown that the exhaust gas valve 46 can be used in a high-pressure EGR loop 16, the exhaust gas valve 46 of the present invention can also be used in a low-pressure EGR loop as well, or a combination high-pressure and low-pressure EGR loop. It is to be appreciated that the exhaust gas valve 46 can be used with any other type of exhaust gas recirculation system where a single valve is needed to distribute the exhaust gas flow through an EGR cooler and EGR cooler bypass passage.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for directing exhaust gas through an exhaust gas recirculation system, comprising the steps of:
   providing an engine having an intake, and an exhaust;
   providing an exhaust gas recirculation passage, an exhaust gas recirculation cooler, and an exhaust gas recirculation bypass passage;
   providing a single valve operably associated with said exhaust gas recirculation passage, said exhaust gas recirculation cooler, and said exhaust gas recirculation bypass passage;
   providing said single valve with a housing;
   providing said single valve with a solid semi-circular disc positioned in said housing;
   actuating the single valve to direct the flow of exhaust gas from said exhaust gas recirculation passage exclusively through said exhaust gas recirculation bypass passage;
   actuating said single valve to direct the flow of exhaust gas from said exhaust gas recirculation passage exclusively through said exhaust gas recirculation cooler;
   actuating said single valve to simultaneously prevent the flow of exhaust gas from said exhaust gas recirculation passage through both of said exhaust gas recirculation bypass passage and said exhaust gas recirculation cooler;
   actuating said single valve to direct the flow of exhaust gas from said exhaust gas recirculation passage partially through said exhaust gas recirculation bypass passage or partially through said exhaust gas recirculation cooler; and
   rotating said solid semi-circular disc in said housing to direct exhaust gas to flow through said exhaust gas recirculation cooler, and block the flow of exhaust gas to said exhaust gas recirculation bypass passage.

2. The method of claim 1, further comprising the steps of:
   rotating said solid semi-circular disc in said housing to direct exhaust gas to flow through said exhaust gas recirculation bypass passage, and block the flow of exhaust gas to said exhaust gas recirculation cooler;
   rotating said solid semi-circular disc in said housing to direct exhaust gas to flow through both said exhaust gas recirculation bypass passage, and said exhaust gas recirculation cooler; and rotating said solid semi-circular disc in said housing to block the flow of exhaust gas to both said exhaust gas recirculation bypass passage, and said exhaust gas recirculation cooler.

3. The method of claim 1, further comprising the step of controlling the temperature of exhaust gas by using said single valve to direct exhaust gas to either said exhaust gas recirculation cooler or said exhaust gas recirculation bypass passage.

4. The method of claim 1, further comprising the step of controlling the intake manifold temperature by using said single valve to direct exhaust gas flow through either exhaust gas recirculation cooler or said exhaust gas recirculation bypass passage.

5. An exhaust gas valve assembly for an engine having an exhaust and an intake, comprising:
   an exhaust gas recirculation passage for receiving exhaust gas from said exhaust manifold, an exhaust gas recirculation bypass passage, and an exhaust gas recirculation cooler;
   an exhaust gas valve operably associated with said exhaust gas recirculation bypass passage and said exhaust gas recirculation cooler, wherein said exhaust gas valve includes a semi-circular disc that rotates to control the flow of exhaust gas; and
   an actuator for operating said exhaust gas valve;
   wherein said actuator controls said exhaust gas valve to direct exhaust gas exclusively through said exhaust gas recirculation cooler, said actuator controls said exhaust gas valve to direct exhaust gas exclusively through said exhaust gas recirculation bypass passage, said actuator controls said exhaust gas valve to direct exhaust gas simultaneously through both said exhaust gas recirculation cooler and said exhaust gas recirculation bypass passage, and said actuator controls said exhaust gas valve to simultaneously prevent exhaust gas flow through both of said exhaust gas recirculation cooler and said exhaust gas recirculation bypass passage.

6. The exhaust gas valve assembly of claim 5, further comprising:
   a turbocharger unit having a turbine and a compressor operably associated with said engine; and
   wherein said exhaust gas recirculation passage, said exhaust gas recirculation bypass passage, and said exhaust gas recirculation cooler form a high-pressure exhaust gas recirculation loop located upstream of said turbine and downstream of said compressor.

7. The exhaust gas valve assembly of claim 5, wherein exhaust gas exits said exhaust gas recirculation cooler and said exhaust gas bypass passage downstream of a compressor for a turbocharger unit, allowing said single valve to control the temperature of air introduced into said intake by directing exhaust gas to either said exhaust gas recirculation cooler or said exhaust gas bypass passage.

8. The exhaust gas valve assembly of claim 5, wherein said exhaust gas valve closes off exhaust flow to said exhaust gas recirculation cooler and said exhaust gas recirculation bypass passage.

9. The exhaust gas valve assembly of claim 5, wherein said exhaust gas valve partially closes off exhaust flow to said exhaust gas recirculation cooler, or partially blocks off exhaust flow to said exhaust gas recirculation bypass passage.

10. The exhaust gas valve assembly of claim 5, wherein said exhaust gas valve controls the temperature of exhaust gas input into the intake by directing exhaust gas to either said exhaust gas recirculation cooler or said exhaust gas bypass passage.

11. The exhaust gas valve assembly of claim 5, wherein said exhaust gas valve is integrated with said exhaust gas recirculation cooler, and integrated with said exhaust gas recirculation bypass passage.

12. The exhaust gas valve assembly of claim 5, wherein said exhaust gas valve is integrated with said exhaust gas recirculation passage, and integrated with said exhaust gas recirculation bypass passage.

13. The exhaust gas valve assembly of claim 5, wherein said valve is integrated into said turbine, and integrated with said exhaust gas recirculation passage.

14. The exhaust gas valve assembly of claim 5, further comprising a flow control valve for controlling the amount of exhaust gas flow.

15. The exhaust gas valve assembly of claim 14, wherein said flow control valve is located upstream of said exhaust gas valve.

16. The exhaust gas valve assembly of claim 15, wherein said flow control valve is located downstream of said exhaust gas recirculation cooler and said exhaust gas recirculation bypass passage.

17. An exhaust gas valve assembly for an engine having an intake and an exhaust, comprising:
   an exhaust gas recirculation cooler operable for receiving exhaust gas from the exhaust, and delivering said exhaust gas to the intake;
   an exhaust gas recirculation bypass passage operable for receiving exhaust gas from the exhaust, bypassing said exhaust gas recirculation cooler, and delivering said exhaust gas to the intake;
   a single valve operably associated with said exhaust gas recirculation cooler and said exhaust gas recirculation bypass passage, said single valve being selectively operable for opening and closing flow from said exhaust to said exhaust gas recirculation cooler, said single valve also being operable for opening and closing flow from said exhaust to said exhaust gas recirculation bypass passage, and said single valve being operable for prohibiting flow to both said exhaust gas recirculation cooler and said exhaust gas recirculation bypass passage, said single valve also operable for metering flow therebetween; and
   said single valve having a housing, and a solid semi-circular disc located inside said housing, wherein said semi-circular disc is rotated inside said housing controlling the flow of exhaust gas.

18. The exhaust gas valve assembly of claim 17, further comprising:
   a turbocharger unit which includes a turbine and a compressor, operably associated with an engine;
   and exhaust gas recirculation passage; and
   wherein said exhaust gas recirculation passage, said exhaust gas recirculation bypass passage, form a high-pressure exhaust gas recirculation loop.

19. The exhaust gas valve assembly of claim 18, wherein said high-pressure exhaust gas recirculation loop is located upstream from said turbine, and downstream from said compressor.

20. The exhaust gas valve assembly of claim 18, wherein said single valve is integrated with said exhaust gas recirculation bypass passage, and integrated with said turbine.

21. The exhaust gas valve assembly of claim 18, wherein said single valve is integrated with said exhaust gas recirculation passage upstream of said exhaust gas recirculation cooler, and integrated with said exhaust gas recirculation bypass passage.

22. The exhaust gas valve assembly of claim 17, wherein exhaust gas exits said exhaust gas recirculation cooler and said exhaust gas bypass passage upstream of a compressor for a turbocharger unit, allowing said single valve to control the temperature of air introduced into said compressor by directing exhaust gas to either said exhaust gas recirculation cooler or said exhaust gas bypass passage.

23. The exhaust gas valve assembly of claim 17, wherein said single valve is integrated with said exhaust gas recirculation cooler, and said exhaust gas recirculation passage.

24. The exhaust gas valve assembly of claim 17, further comprising an actuator for actuating said single valve to selectively direct the flow of exhaust gas through either exclusively said exhaust gas recirculation bypass passage, exclusively said exhaust gas recirculation cooler, simultaneously through said exhaust gas recirculation bypass passage and said exhaust gas recirculation cooler, or for preventing the flow of exhaust gas through both said exhaust gas recirculation passage and said exhaust gas recirculation cooler.

25. The exhaust gas valve assembly of claim 17, wherein said single valve directs the flow of exhaust gas through said exhaust gas recirculation cooler, or into said exhaust gas recirculation bypass passage, bypassing said exhaust gas recirculation cooler, any variation therebetween, or for preventing the flow of exhaust gas through both said exhaust gas recirculation passage and said exhaust gas recirculation cooler.

26. The exhaust gas valve assembly of claim 17, wherein said single valve controls the temperature of exhaust gas introduced into the intake by directing exhaust gas to either said exhaust gas recirculation cooler or said exhaust gas bypass passage.

27. The exhaust gas valve assembly of claim 17, further comprising a flow control valve for controlling the amount of exhaust gas flow between the exhaust and the intake.

28. The exhaust gas valve assembly of claim 27, wherein said flow control valve is placed in a location selected from the group comprising upstream of said single valve, or downstream of said single valve.

29. The exhaust gas valve assembly of claim 27, wherein said flow control valve and said single valve are integrated into a single housing.

* * * * *

UNITED STATES PATENT AND TRADEMARK OFFICE
CERTIFICATE OF CORRECTION

PATENT NO. : 7,621,128 B2  Page 1 of 1
APPLICATION NO. : 11/607708
DATED : November 24, 2009
INVENTOR(S) : Czarnowski et al.

It is certified that error appears in the above-identified patent and that said Letters Patent is hereby corrected as shown below:

Column 7,
Line 3, Claim 22, delete "upstream" and insert --downstream--.

Column 7,
Line 5, Claim 22, delete "compressor" and insert --intake--.

Column 7,
Line 10, Claim 23, "recirculation passage" should be --recirculation bypass passage--.

Signed and Sealed this

Nineteenth Day of January, 2010

David J. Kappos
*Director of the United States Patent and Trademark Office*